US012400817B2

(12) United States Patent
Douglass et al.

(10) Patent No.: US 12,400,817 B2
(45) Date of Patent: Aug. 26, 2025

(54) FABRICATION OF PRINTED FUSE

(71) Applicant: Eaton Intelligent Power Limited, Dublin (IE)

(72) Inventors: Robert S. Douglass, Wildwood, MO (US); John Trublowski, Troy, MI (US); Rajen Modi, Senoia, GA (US); Nilay Mehta, Peachtree City, GA (US); Venkat Raman Thenkarai Narayanan, Prague (CZ)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/165,806

(22) Filed: Feb. 7, 2023

(65) Prior Publication Data

US 2023/0187160 A1 Jun. 15, 2023

Related U.S. Application Data

(63) Continuation of application No. 17/185,537, filed on Feb. 25, 2021, now Pat. No. 11,636,993, which is a (Continued)

(51) Int. Cl.
*H01H 85/046* (2006.01)
*H01H 69/02* (2006.01)
(Continued)

(52) U.S. Cl.
CPC ........ *H01H 85/046* (2013.01); *H01H 69/022* (2013.01); *H01H 85/143* (2013.01);
(Continued)

(58) Field of Classification Search
CPC .......... H02H 3/087; H02H 7/085; H02H 3/08; H01H 9/106; H01H 69/02; H01H 85/046;
(Continued)

(56) References Cited

U.S. PATENT DOCUMENTS

| | | | |
|---|---|---|---|
| 6,163,244 | A | 12/2000 | Endo |
| 6,194,989 | B1 | 2/2001 | Douglass |

(Continued)

FOREIGN PATENT DOCUMENTS

| | | | |
|---|---|---|---|
| CN | 101647081 | A | 2/2010 |
| CN | 109314022 | A | 2/2019 |

(Continued)

*Primary Examiner* — Thiem D Phan
(74) *Attorney, Agent, or Firm* — Baker Botts L.L.P.

(57) ABSTRACT

A power fuse for protecting an electrical load subject to transient load current cycling events in a direct current electrical power system is provided. The power fuse includes at least one fuse element assembly that includes one or more substrates, one or more sets of weak spots, and a conductor. The weak spots are formed on the substrates, and the substrates are longitudinally spaced apart from one another along the conductor. The conductor is separately provided from the substrate and the weak spots. The conductor includes one or more strips of metal having no stamped weak spot openings therein and therefore avoiding thermal-mechanical fatigue strain in the conductor when subjected to the transient load current cycling events. The conductor includes connector sections that are attached to respective ones of the sets of weak spots, and extending sections coupling the connector sections.

17 Claims, 13 Drawing Sheets

Related U.S. Application Data continuation-in-part of application No. 16/590,020, filed on Oct. 1, 2019, now Pat. No. 11,087,943.

(60) Provisional application No. 62/897,024, filed on Sep. 6, 2019.

(51) Int. Cl.

| | |
|---|---|
| ***H01H 85/143*** | (2006.01) |
| *H01H 85/18* | (2006.01) |
| *H01H 85/38* | (2006.01) |

(52) U.S. Cl.

CPC ....... *H01H 85/18* (2013.01); *H01H 2085/383* (2013.01); *Y10T 29/49107* (2015.01); *Y10T 29/53248* (2015.01)

(58) Field of Classification Search

CPC ........ H01H 85/38; H01H 85/06; H01H 85/12; Y10T 137/8242; Y10T 29/49107; Y10T 29/53248

USPC ....... 29/756, 623, 592.1, 825, 829, 874, 876

See application file for complete search history.

(56) References Cited

U.S. PATENT DOCUMENTS

| | | | | |
|---|---|---|---|---|
| 2010/0164677 | A1 | 7/2010 | Yang | |
| 2015/0348731 | A1 | 12/2015 | Douglass | |
| 2015/0348732 | A1 * | 12/2015 | Douglass | H01H 85/175 337/198 |
| 2017/0365434 | A1 | 12/2017 | Douglass | |

FOREIGN PATENT DOCUMENTS

| | | | |
|---|---|---|---|
| CN | 114586127 | A | 6/2022 |
| EP | 0020727 | A1 | 1/1981 |
| JP | H05307926 | A | 11/1993 |
| KR | 20190019120 | A | 2/2019 |
| WO | WO 2016064352 | A1 | 4/2016 |

* cited by examiner

FABRICATION OF PRINTED FUSE

CROSS REFERENCE TO RELATED APPLICATIONS

This application is a continuation under 35 U.S.C. § 120 of U.S. patent application Ser. No. 17/185,537 filed on Feb. 25, 2021, entitled "Design and Fabrication of Printed Fuse," which is a continuation-in-part under 35 U.S.C. § 120 of U.S. patent application Ser. No. 16/590,020 filed on Oct. 1, 2019, entitled "Design and Fabrication of Printed Fuse," now U.S. Pat. No. 11,087,943, issued on Aug. 10, 2021, which relates in subject matter to and claims the benefit under 35 U.S.C. § 119(e) of U.S. Provisional Application Ser. No. 62/897,024 filed Sep. 6, 2019, entitled "Design and Fabrication of Printed Fuse," the entirety of all which documents are incorporated by reference.

BACKGROUND

The field of the disclosure relates generally to electrical circuit protection fuses, and more specifically to the fabrication of power fuses including thermal-mechanical strain fatigue resistant fusible element assemblies.

Fuses are widely used as overcurrent protection devices to prevent costly damage to electrical circuits. Fuse terminals typically form an electrical connection between an electrical power source or power supply and an electrical component or a combination of components arranged in an electrical circuit. One or more fusible links or elements, or a fuse element assembly, is connected between the fuse terminals, so that when electrical current flowing through the fuse exceeds a predetermined limit, the fusible elements melt and open one or more circuits through the fuse to prevent electrical component damage.

Full-range power fuses are operable in high voltage power distributions to safely interrupt both relatively high fault currents and relatively low fault currents with equal effectiveness. In view of constantly expanding variations of electrical power systems, known fuses of this type are disadvantaged in some aspects. Improvements in full-range power fuses are desired to meet the needs of the marketplace.

BRIEF DESCRIPTION OF THE DRAWINGS

Non-limiting and non-exhaustive embodiments are described with reference to the following figures, wherein like reference numerals refer to like parts throughout the various drawings unless otherwise specified.

DETAILED DESCRIPTION

Figure 1:
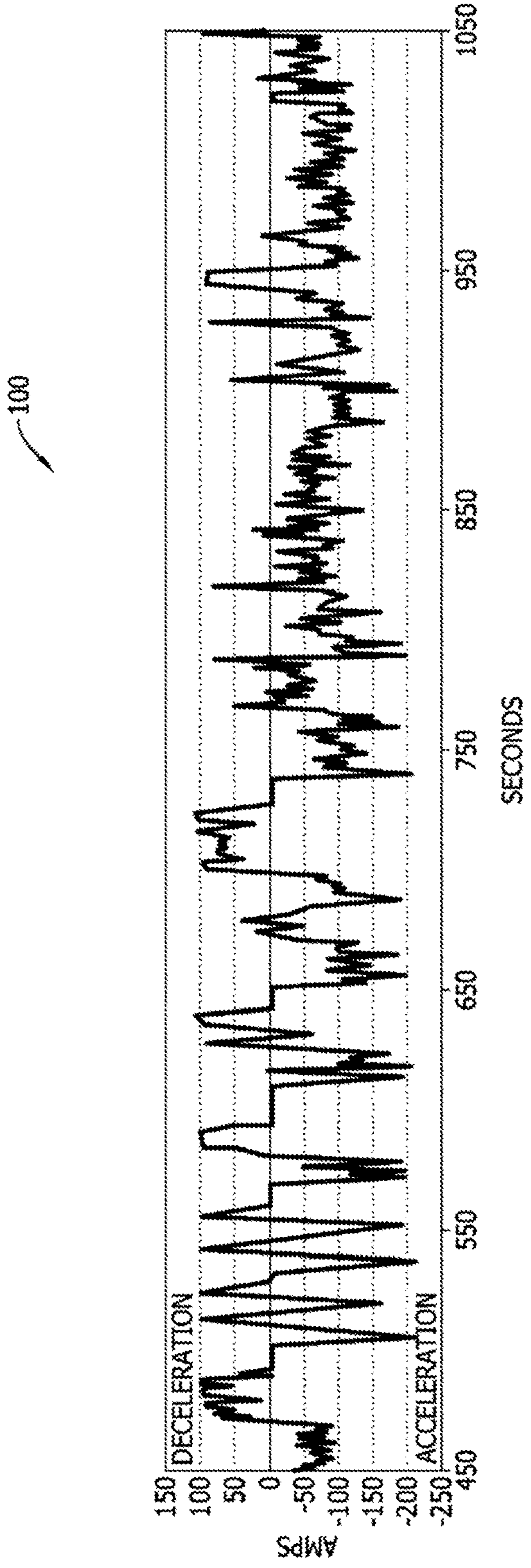
FIG. 1 illustrates an exemplary transient current pulse profile generated in an electrical power system.

Recent advancements in electric vehicle technologies present unique challenges to fuse manufacturers. Electric vehicle manufacturers are seeking fusible circuit protection for electrical power distribution systems operating at voltages much higher than conventional electrical power distribution systems for vehicles, while simultaneously seeking smaller fuses to meet electric vehicle specifications and demands Electrical power systems for conventional, internal combustion engine-powered vehicles operate at relatively low voltages, typically at or below about 48 VDC. Electrical power systems for electric-powered vehicles, referred to herein as electric vehicles (EVs), however, may operate at much higher voltages. The relatively high voltage systems (e.g., 200 VDC and above) of Evs may generally enable the batteries to store more energy from a power source and provide more energy to an electric motor of the vehicle with lower losses (e.g., heat loss) than conventional batteries storing energy at 12 Volts (V) or 24 V used with internal combustion engines, and more recent 48 V power systems.

EV original equipment manufacturers (OEMs) employ circuit protection fuses to protect electrical loads in all-battery electric vehicles (BEVs), hybrid electric vehicles (HEVs) and plug-in hybrid electric vehicles (PHEVs). Across each EV type, EV manufacturers may seek to maximize the mileage range of the EV per battery charge while reducing cost of ownership. Accomplishing these objectives turns on the energy storage and power delivery of the EV system, as well as the size, volume, and mass of the vehicle components that are carried by the power system. Smaller and/or lighter vehicles may more effectively meet these demands than larger and heavier vehicles. As such, all EV components are now being scrutinized for potential size, weight, and cost savings.

Generally speaking, larger components may tend to have higher associated material costs, tend to increase the overall size of the EV or occupy an undue amount of space in a shrinking vehicle volume, and may tend to introduce greater mass that directly reduces the vehicle mileage per single battery charge. Known high voltage circuit protection fuses may, however, be relatively large and relatively heavy components. Historically, and for good reason, circuit protection fuses have tended to increase in size to meet the demands of high voltage power systems as opposed to lower voltage systems. As such, existing fuses needed to protect high voltage EV power systems may be much larger than the existing fuses needed to protect the lower voltage power systems of conventional, internal combustion engine-powered vehicles. Smaller and lighter high voltage power fuses are desired to meet the needs of EV manufacturers, without sacrificing circuit protection performance.

Electrical power systems for state of the art EVs may operate at voltages as high as 450 VDC or even higher. The increased power system voltage may desirably deliver more power to the EV per battery charge. Operating conditions of electrical fuses in such high voltage power systems may be much more severe, however, than lower voltage systems. Specifically, specifications relating to electrical arcing conditions when the fuse opens may be particularly difficult to meet for higher voltage power systems, especially when coupled with the industry preference for reduction in the size of electrical fuses. Current cycling loads imposed on power fuses by state of the art EVs may also tend to impose mechanical strain and wear that can lead to premature failure of a conventional fuse element. While known power fuses may be presently available for use by EV OEMs in high voltage circuitry of state of the art EV applications, the size and weight, not to mention the cost, of conventional power fuses capable of meeting the requirements of high voltage power systems for Evs can be impractically high for implementation in new EVs.

Providing relatively smaller power fuses that can capably handle high current and high battery voltages of state of the art EV power systems, while still providing acceptable interruption performance as the fuse element operates at high voltages can be challenging, to say the least. Improvements are needed to longstanding and unfulfilled needs in the art.

While described in the context of EV applications and a particular type and ratings of fuse, the benefits of the disclosure are not necessarily limited to EV applications or to the particular type or ratings described. Rather, the benefits of the disclosure are believed to more broadly accrue to many different power system applications and can also be practiced in part or in whole to construct different types of fuses having similar or different ratings than those discussed herein.

FIG. 1 illustrates an exemplary current drive profile 100 in an EV power system application that can render a fuse, and specifically the fuse element or elements therein susceptible to load current cycling fatigue. The current is illustrated along a vertical axis in FIG. 1 with time illustrated along the horizontal axis. In typical EV power system applications, power fuses may be used as circuit protection devices to prevent damage to electrical loads from electrical fault conditions. The power system may be operated at voltages above 500 V and/or at currents above 150 Amperes (A). Considering the example of FIG. 1, EV power systems experience large seemingly random variance in current loads over relatively short periods of time, for example, between −250 A and 150 A. The seemingly random variance in current produces current pulses of various magnitudes in sequences caused by seemingly random driving habits based on the actions of the driver of the EV vehicle, traffic conditions and/or road conditions. This creates a practically infinite variety of current loading cycles on the EV drive motor, the primary drive battery, and any protective power fuse included in the system.

Such random current loading conditions, exemplified in the current pulse profile of FIG. 1, may be cyclic in nature for both the acceleration of the EV (corresponding to battery drain) and the deceleration of the EV (corresponding to regenerative battery charging). This current cyclic loading imposes thermal cycling stress on the fuse element, and more specifically in the weak spots of the fuse element assembly in the power fuse, by way of a joule effect heating process. This thermal cyclic loading of the fuse element imposes mechanical expansion and contraction cycles on the fuse element weak spots in particular. This repeated mechanical cyclic loading of the fuse element weak spots imposes an accumulating strain that damages the weak spots to the point of breakage over time. For the purposes of the present description, this thermal-mechanical process and phenomena is referred to herein as fuse fatigue. As explained further below, fuse fatigue is attributable mainly to creep strain as the fuse endures the drive profile. Heat generated in the fuse element weak spots is the primary mechanism leading to the onset of fuse fatigue.

Figure 2A:
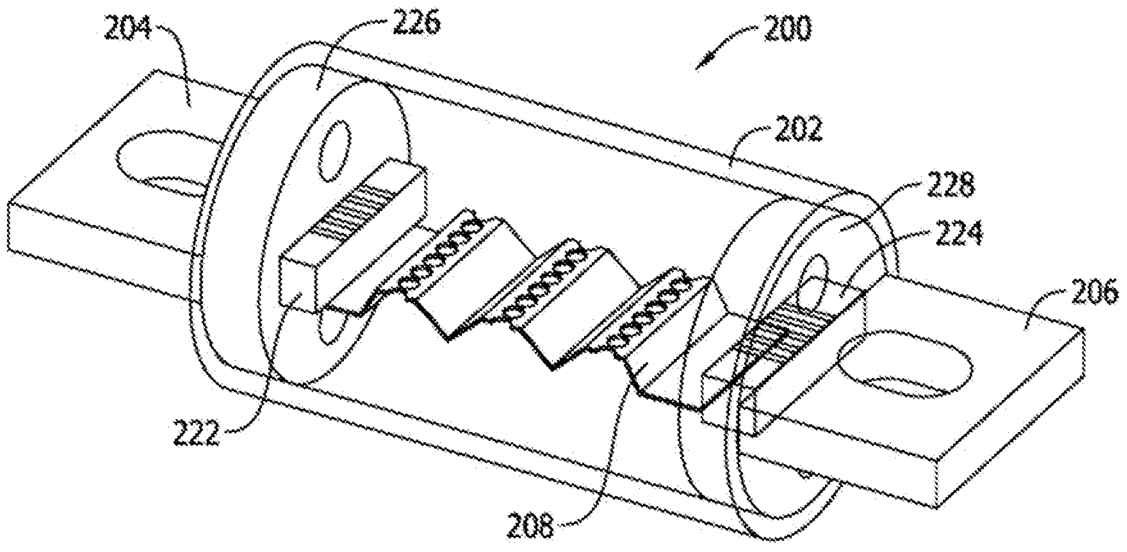
FIG. 2A (PRIOR ART)
FIG. 2A illustrates a schematic perspective view of a known power fuse.

FIG. 2A shows a known high voltage power fuse 200 that is designed for use with an EV power system. The power fuse 200 includes a housing 202, terminal blades 204, 206 configured to connect to line and load side circuitries, and a fuse element assembly 208 that completes an electrical connection between the terminal blades 204, 206 through terminal contact blocks 222, 224 provided on end plates 226, 228. When subjected to predetermined current conditions, at least a portion of the fuse element assembly 208 melts, disintegrates, or otherwise structurally fails and opens the circuit path between the terminal blades 204, 206. Load side circuitry is therefore electrically isolated from the line side circuitry to protect load side circuit components from damage when electrical fault conditions occur.

Figure 2B:
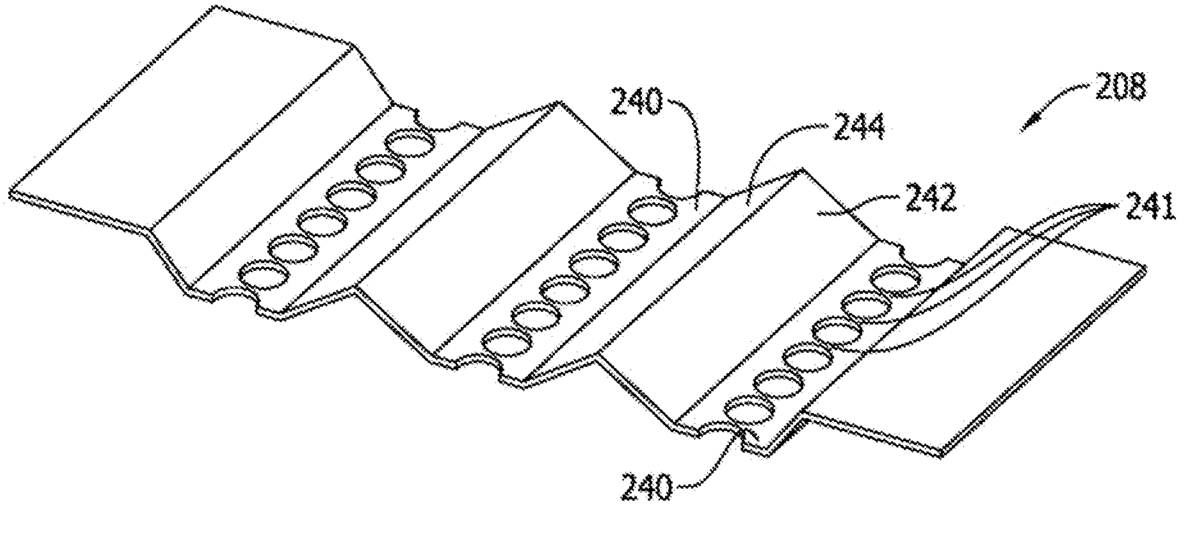
FIG. 2B (PRIOR ART)
FIG. 2B is a schematic perspective view of the fuse element assembly of the power fuse illustrated in FIG. 2A.

FIG. 2B illustrates the fuse element assembly 208 in further detail. The fuse element assembly 208 is generally formed from a strip of electrically conductive material into a series of co-planar sections 240 connected by oblique sections 242, 244. The oblique sections 242, 244 may be formed or bent out of plane from the planar sections 240.

In the example illustrated, the planar sections 240 define a plurality of sections of reduced cross-sectional area 241, referred to in the art as weak spots. The weak spots 241 may be defined by apertures in the planar sections 240. The weak spots 241 correspond to the narrow portion of the section 240 between adjacent apertures. The reduced cross-sectional areas at the weak spots 241 will experience higher heat concentration than the rest of the fuse element assembly 208 as current flows through the fuse element assembly 208.

The weak spots 241 of the fuse element assembly 208 fabricated by metal stamping or punching have been found to be disadvantageous for EV applications having the type of cyclic current loads described above. Such stamped fuse element designs undesirably introduce mechanical strains and stresses on the fuse element weak spots 241 such that a shorter service life tends to result. This short fuse service life manifests itself in the form of nuisance fuse operation resulting from the mechanical fatigue of the fuse element at the weak spots 241.

Figure 2C:
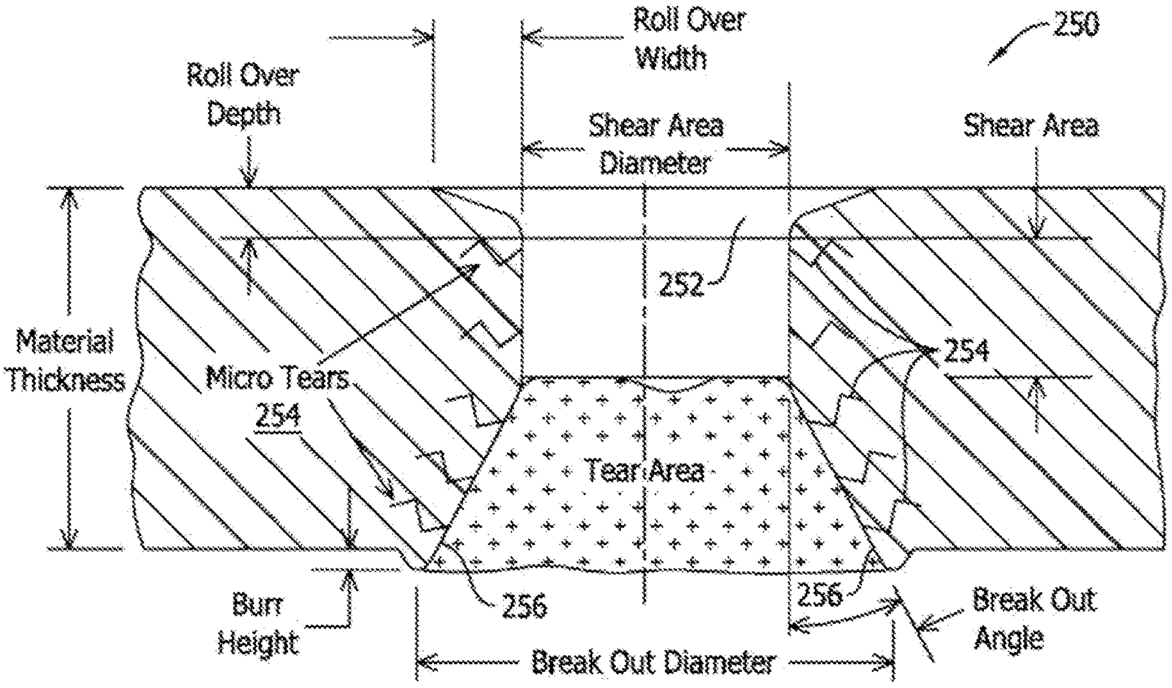
FIG. 2C (PRIOR ART)
FIG. 2C is a schematic diagram of a weak spot of the fuse element assembly illustrated in FIG. 2B.

FIG. 2C shows the cross-sectional view of a metal plate 250 after an aperture 252 is punched through the metal plate 250. After a punching or stamping process, micro tears 254 occur along the border 256 of the aperture 252.

Figure 2D:
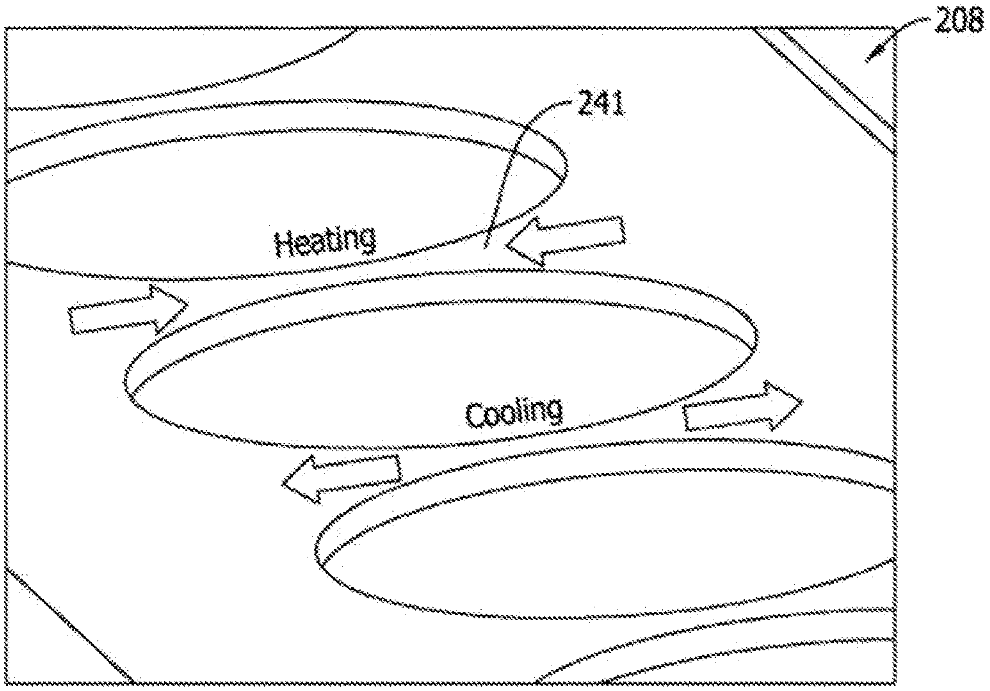
FIG. 2D (PRIOR ART)
FIG. 2D is a schematic diagram illustrating the weak spots of the fuse element assembly illustrated in FIG. 2B under load current cycling events.
Figure 2E:
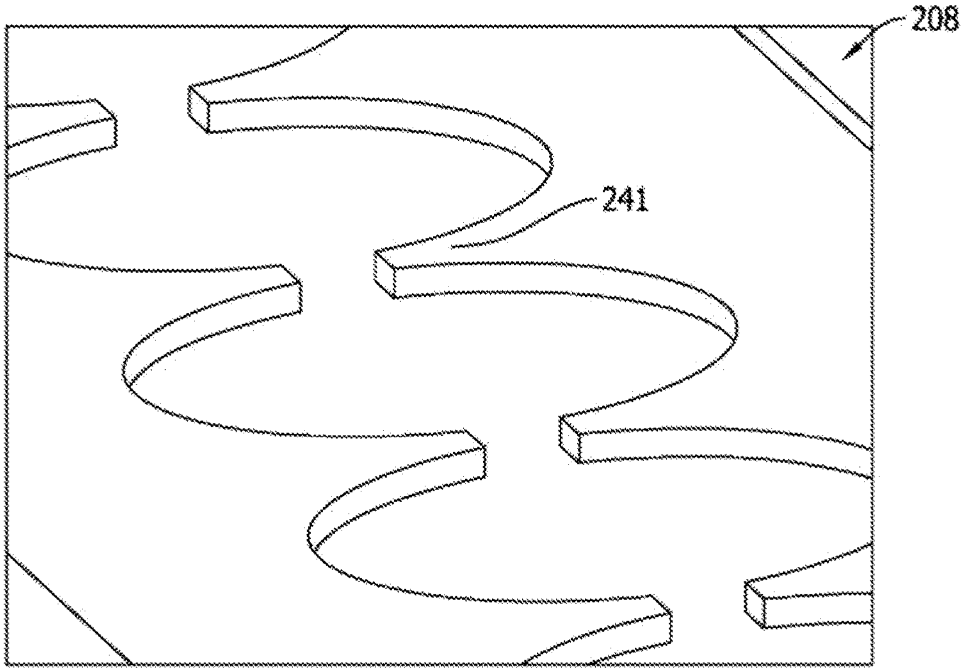
FIG. 2E (PRIOR ART)
FIG. 2E is a schematic diagram illustrating the weak spots of the fuse element assembly illustrated in FIG. 2E fail after load current cycling events.

As illustrated in FIGS. 2D and 2E, the weak spots 241 of the fuse element assembly 208 experience repeated high current pulses and cyclic current events (FIG. 2D), which lead to metal fatigue from grain boundary disruptions followed by crack propagation and failure in the fuse element assembly 208 at the weak spots 241 (FIG. 2E). The mechanical constraints of the fuse element assembly 208 may be inherent in the stamped fuse element design and manufacture, which unfortunately has been found to promote in-plane buckling of the weak spots 241 during repeated load current cycling. This in-plane buckling is the result of damage to the metal grain boundaries where a separation or slippage occurs between adjacent metal grains. Such buckling of weak spots 241 occurs over time and is accelerated and more pronounced with higher transient current pulses. The greater the heating-cooling delta in the transient current pulses the greater the mechanical influence, and thus the greater the in-place buckling deformation of the weak spots 241.

Repeated physical mechanical manipulations of metal, caused by the heating effects of the transient current pulses, in turn cause changes in the grain structure of metal fuse element. These mechanical manipulations may be sometimes referred to as working the metal. Working of metals will cause a strengthening of the grain boundaries where adjacent grains may be tightly constrained to neighboring grains. Over working of a metal will result in disruptions in the grain boundary, where grains slip past each other and cause what is called a slip band or plane. This slippage and separation between the grains result in a localized increase of the electrical resistance that accelerates the fatigue process by increasing the heating effect of the current pulses. The formation of slip bands is where fatigue cracks are first initiated.

The inventors have found that a manufacturing method of stamping or punching metal to form the fuse element assembly 208 causes localized slip bands on all stamped edges of the fuse element weak spots 241 because the stamping processes to form the weak spots 241 may be shearing and tearing mechanical processes. This tearing process pre-stresses the weak spots 241 with many slip band regions. The slip bands and fatigue cracks, combined with the buckling described due to heat effects, eventually lead to a premature structural failure of the weak spots 241 that may be unrelated to electrical fault conditions. Such premature failure mode that does not relate to a problematic electrical condition in the power system is sometimes referred to as nuisance operation of the fuse. Since once the fuse elements fail the circuitry connected to the fuse is not operational again until the fuse is replaced, avoiding such nuisance operation is highly desirable in an EV power system from the perspective of both EV manufacturers and consumers. Indeed, given an increased interest in EV vehicles and their power systems, the effects of fuse fatigue may be deemed to be a negative Critical to Quality (CTQ) attribute in the vehicle design.

Accordingly, improved fuse elements and methods for fabricating fuse elements including weak spots that are fatigue resistant may be highly desirable.

Exemplary embodiments of fuse elements and the method of fabricating such fuse elements are described below that advantageously avoid the strain damages at weak spots from the manufacturing process of stamping or punching, while also providing an effective arc extinguishing mechanism. Weak spots in the exemplary embodiments may be formed directly onto a planar substrate, avoiding micro tears from the punching or stamping processes. The weak spots may be connected by a separately-fabricated conductor having coplanar connector sections and oblique connector sections used for effective arc extinguishing.

While described below in reference to particular embodiments, such description is intended for the sake of illustration rather than limitation. The significant benefit of the inventive concepts will now be explained in reference to the exemplary embodiments illustrated in the FIGS. Method aspects will be in part apparent and in part explicit in the following discussion.

Figure 3:
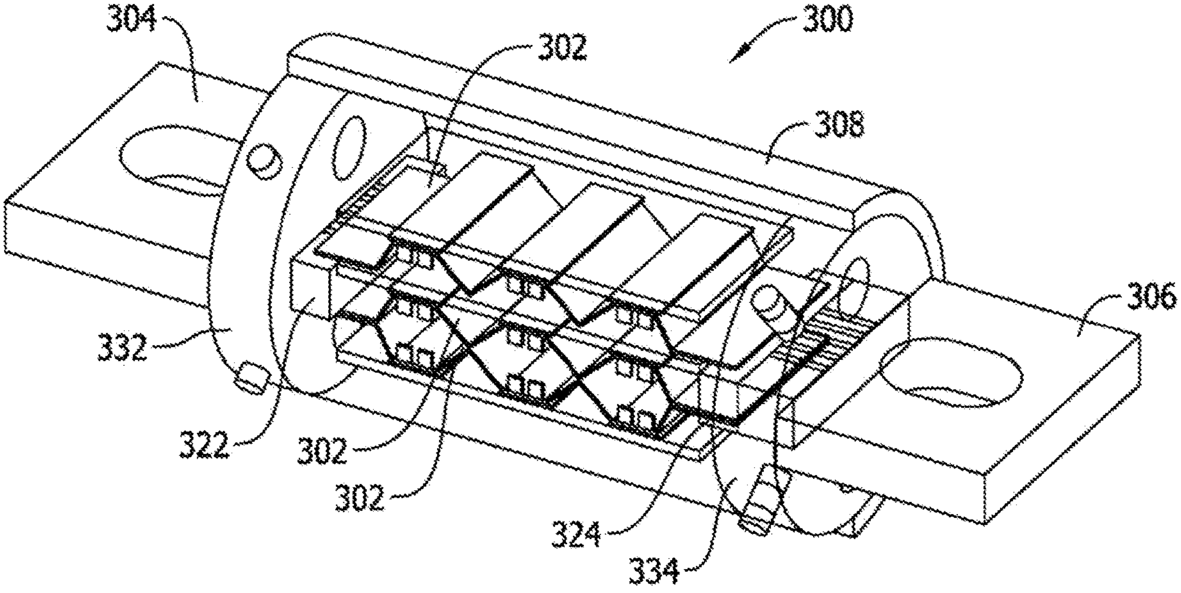
FIG. 3 is a schematic partial perspective view of an exemplary power fuse.

Referring now to FIGS. 3-7, an exemplary power fuse 300 is illustrated. The power fuse 300 includes at least one fuse element assembly 302 (FIG. 3). The power fuse 300 may include a housing 308. The power fuse 300 further includes terminal blades 304, 306 configured to connect the power fuse 300 to line and load side circuitry. The electrical connection of the fuse element assembly 302 is completed through terminal contact blocks 322, 324 provided on end plates 332, 334 and the terminal blades 304, 306. When subjected to predetermined current conditions, at least a portion of the fuse element assembly 302 melts, disintegrates, or otherwise structurally fails and opens the circuit path between the terminal blades 304, 306. Load side circuitry is therefore electrically isolated from the line side circuitry to protect load side circuit components from damage when electrical fault conditions occur.

Figure 4:
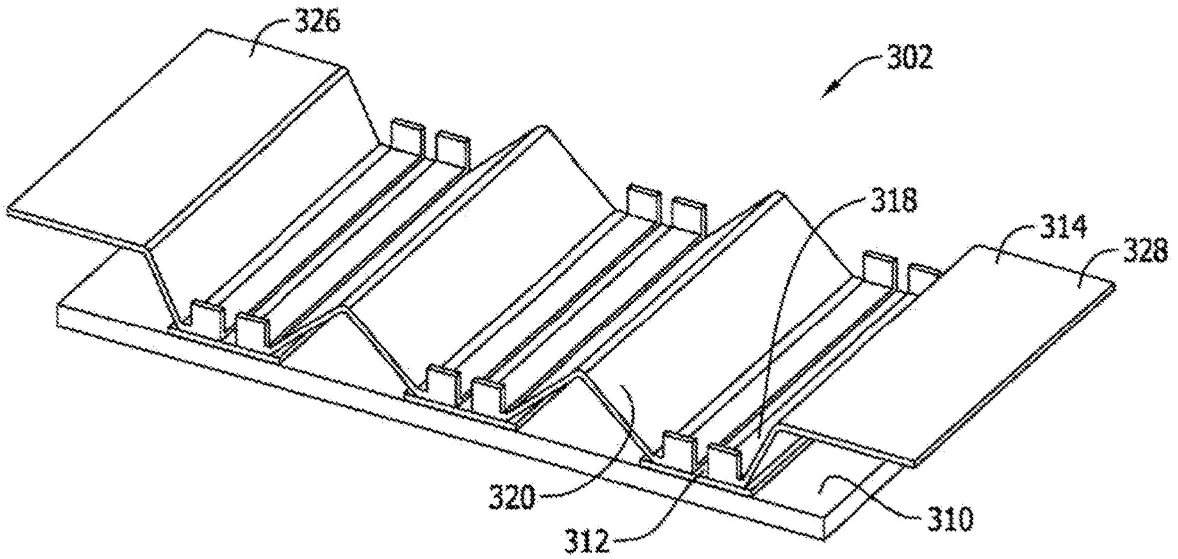
FIG. 4 is a schematic enlarged view of the fuse element assembly for the power fuse illustrated in FIG. 3.

FIG. 4 shows the exemplary fuse element assembly 302 in further detail. The fuse element assembly 302 includes a substrate 310, a plurality of weak spots 312, and a conductor 314.

Figure 5:
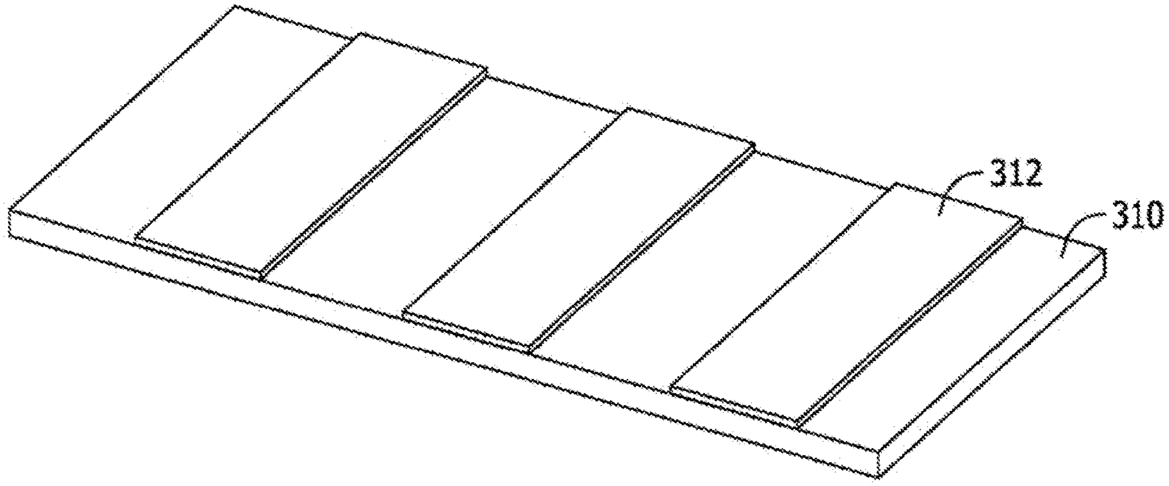
FIG. 5 illustrates the substrate and weak spots of the fuse element assembly illustrated in FIG. 4.

The substrate 310 may be a planar substrate (FIG. 5). The substrate 310 may be elongated. In the exemplary embodiment, the top surface of the substrate 310 is rectangular. In some embodiments, the substrate 310 is ceramic. In one example, the substrate is alumina ceramic. An alumina substrate has a relatively high thermal conductivity (e.g., approximately 30 $Wm^{-1}K^{-1}$), which helps dissipate heat from the weak spots 312.

In the exemplary embodiment, the weak spots 312 may be formed on the substrate 310. The number of weak spots 312 can be three or other numbers such as one, two, or four that enable the fuse element assembly 302 to function as described herein. The weak spots 312 may be spaced apart from each other. In some embodiments, the weak spots 312 may be disposed apart from each other along the longitudinal direction of the substrate 310. The weak spots 312 may be made of conductive material such as copper. The weak spots 312 may be printed on the substrate 310 using known techniques. In some embodiments, however, the weak spots 312 may be formed on the substrate 310 using techniques other than printing. Multiple layers of the weak spots 312 may be formed over one another to change the overall thickness of the weak spots 312. The electrical resistance and performance of the weak spots 312 may be, therefore, relatively more controllable than the weak spots formed by metal stamping or punching. Because the weak spots 312 may be formed without mechanical micro tears from the mechanical manufacturing processes like metal stamping or punching, the weak spots 312 do not suffer from load current cycling fatigue as the weak spots 241 of the known fuse 200, especially when under the large, seemingly random cyclic current changes in a direct current power system of an EV.

Figure 6:
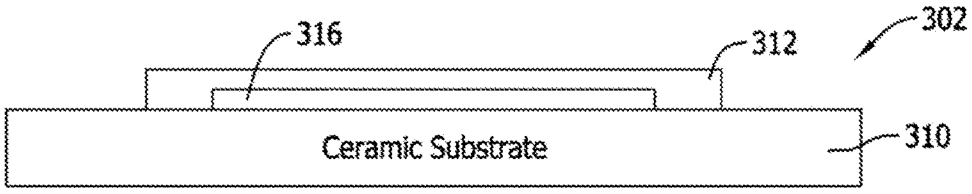
FIG. 6 is a schematic cross-sectional magnified view of a portion of an exemplary fuse element assembly.

In some embodiments, the fuse element assembly 302 further includes a dielectric layer 316 disposed between the substrate 310 and the weak spots 312 (FIG. 6). In an exemplary embodiment, the dielectric layer 316 may be glass or another suitable dielectric material known in the art. When weak spots 312 may be formed with only electrically-conductive materials, the electrically-conductive materials separate when the materials melt in a fusing condition but may reconnect thus allowing the circuit to reconnect. To minimize this reconnection of weak spots 312 to allow the power fuse 300 to function at predetermined current conditions, a layer of dielectric, glass-based layer 316 is deposited under the weak spot 312. The material for the dielectric layer 316 is selected such that it melts at a higher temperature than the weak spots 312 but at a low enough temperature that allows diffusion. The melting temperature of the dielectric layer 316 is approximately 25° C.-50° C. above the maximum fusing temperature of the weak spots 312. This temperature range allows the dielectric layer 316 to be mechanically stable during the fusing process to support the weak spots 312 while allowing the dielectric material to diffuse into the weak spots 312. The melting temperature of the dielectric layer 316 may vary depending on materials. The diffusion is desired for two reasons. First, it provides a means to adjust the weak spot resistance, where more fusing results in more diffusion and higher resistivity. Second, the diffused dielectric layer 316 changes the wetting characteristics of the conductor and does not allow the melted weak spots 312 to reattach.

Referring back to FIG. 4, the weak spots 312 of the fuse element assembly may be connected through the conductor 314. In the exemplary embodiments, the conductor 314 is made from a solid elongated strip metal. The conductor 314 may be made by punching or stamping a solid elongated strip metal. The thickness of the conductor 314 is greater than the weak spots 312. As a result, the weak spots 312 experience more heat than the conductor 314 and open before the conductor 314 under predetermined current conditions. The conductor 314, therefore, does not have stamped weak spot openings and avoids thermal-mechanical fatigue strain when subjected to transient load current cycling events.

In an exemplary embodiment, the conductor 314 includes coplanar connector sections 318 and obliquely extending sections 320. The obliquely extending sections 320 bend out of plane of the coplanar connector sections 318. The conductor 314 may further include first and second terminal tabs extending from the obliquely extending sections 320. The conductor 314 couples to terminal contact blocks 322, 324 through the terminal tabs 326, 328.

In the contemplated embodiment, the coplanar connector sections 318 may be mounted on respective ones of the weak spots 312. Alternatively, the coplanar connector sections 318 may be mounted on the substrate 310 and may be connected with weak spots 312. As a result, the obliquely extending sections 320 extend above the substrate 310 in between the weak spots 312, and the first and second terminal tabs 326, 328 may extend coplanar to one another in a plane spaced from the coplanar connector sections 318 and the substrate 310. The plane of the first and second terminal tabs 326, 328 may extend parallel to the coplanar connector sections 318 and the substrate 310.

In the exemplary embodiment, the power fuse 300 includes three fuse element assemblies 302 (FIG. 3). The power fuse 300 may in other embodiments include other numbers of fuse element assemblies 302, such as one and two, that enable the power fuse 300 to function as described herein. The plurality of fuse element assemblies 302 may be connected in parallel with each other to increase the ratings of the power fuse 300 without increasing the physical size of the power fuse 300. The fuse element assemblies 302 may be arranged such that two neighboring fuse element assemblies may be mirror images of each other. The fuse element assemblies 302 may be stacked together with the substrate of one fuse element assembly facing the conductor of another fuse element assembly.

A full-range fuse can be realized by using at least one fuse element assembly 302 that is responsive to relatively low current operation (or overload faults) and at least one fuse element assembly 302 that is responsive to relatively high current operation (or short circuit faults). The fuse element assemblies 302 may also be used in a fuse that is not full range.

Figure 7:
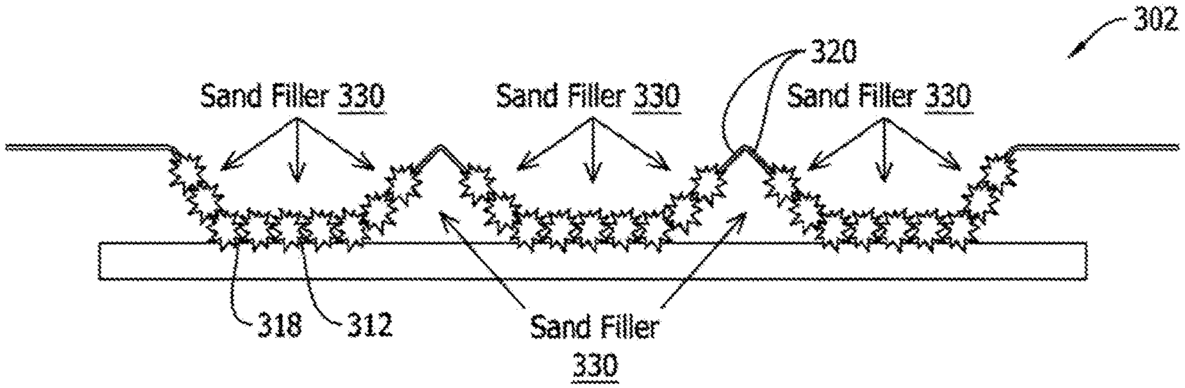
FIG. 7 is a schematic diagram illustrating the arcing in the fuse element assembly illustrated in FIG. 4.

In the exemplary embodiment, the power fuse 300 may further include an arc extinguishing filler 330 (FIG. 7). The arc extinguishing filler 330 surrounds at least part of the fuse element assembly 302. The arc extinguishing filler 330 may be disposed underneath the obliquely extending sections 320. The arc extinguishing filler 330 may also be disposed above the obliquely extending sections 320, the coplanar connector sections 318, and the weak spots 312. The arc extinguishing filler 330 may be introduced to the housing 308 via one or more fill openings in one of the end plates 332, 334 that may be sealed with plugs (not illustrated). The plugs may be fabricated from steel, plastic or other materials in various embodiments. In other embodiments a fill hole or fill holes may be provided in other locations, including but not limited to the housing 308 to facilitate the introduction of the arc extinguishing filler 330.

In one contemplated embodiment, the arc extinguishing filler 330 is composed of quartz silica sand and a sodium silicate binder. The quartz sand has a relatively high heat conduction and absorption capacity in its loose compacted state, but can be silicated to provide improved performance For example, a liquid sodium silicate solution is added to the sand and then the free water is dried off. Separately provided arc barrier materials (not illustrated) may also be provided to prevent arcing from reaching the ends of the terminal tabs 326, 328.

In the exemplary embodiment, the fuse element assembly 302 provides access of the arc to the arc quenching medium such as sand in the arc extinguishing filler 330. When weak spots 312 melt at predetermined current conditions, arcing starts at weak spots 312. As the arc grows in length it migrates from the weak spots 312 and the substrate 310 and follows the obliquely extending sections 320 into the surrounding arc extinguishing filler 330 for efficient cooling and quicker extinguishment.

Figure 8:
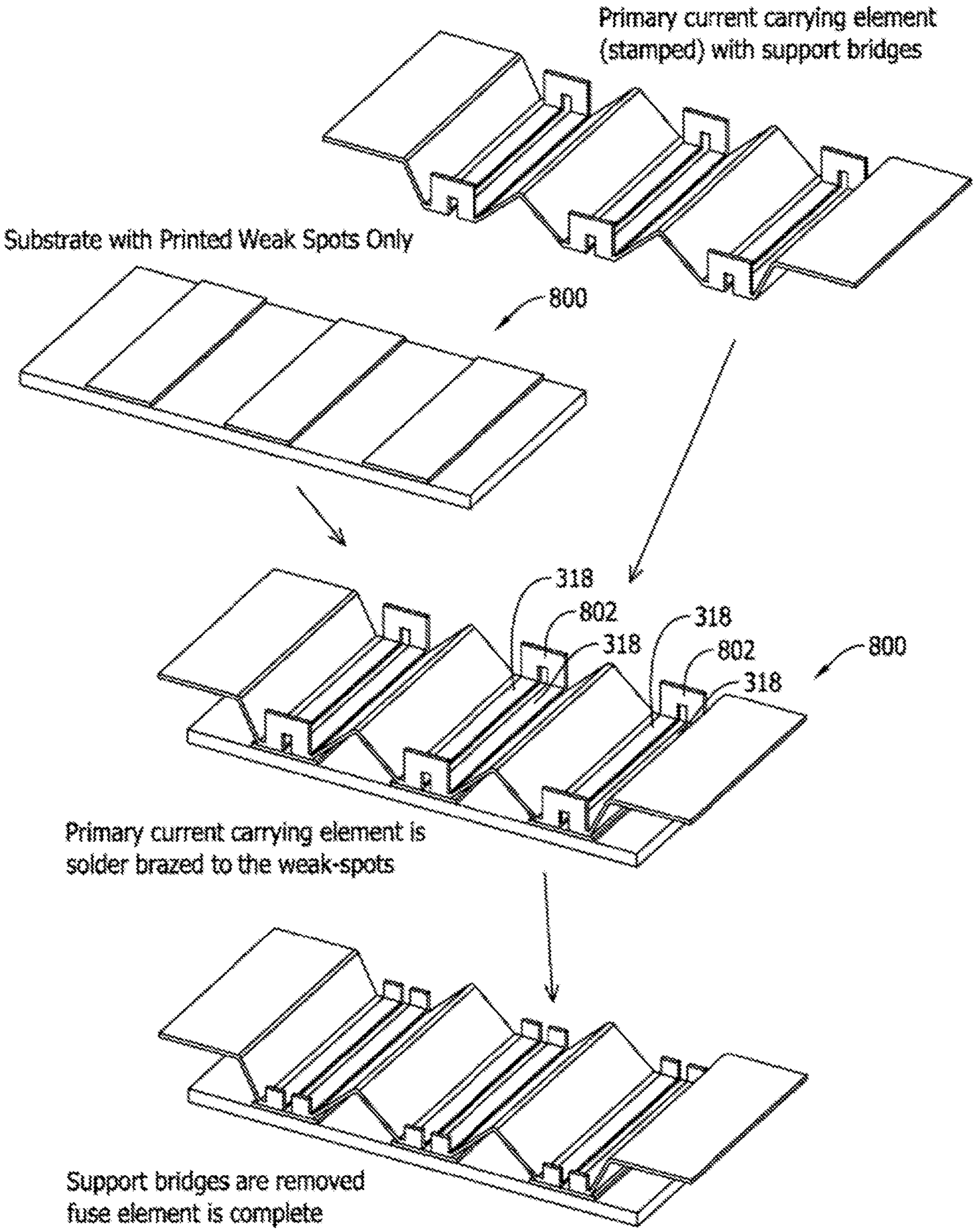
FIG. 8 is a schematic diagram of an exemplary method for fabricating the power fuse illustrated in FIGS. 3-7.
Figure 9:
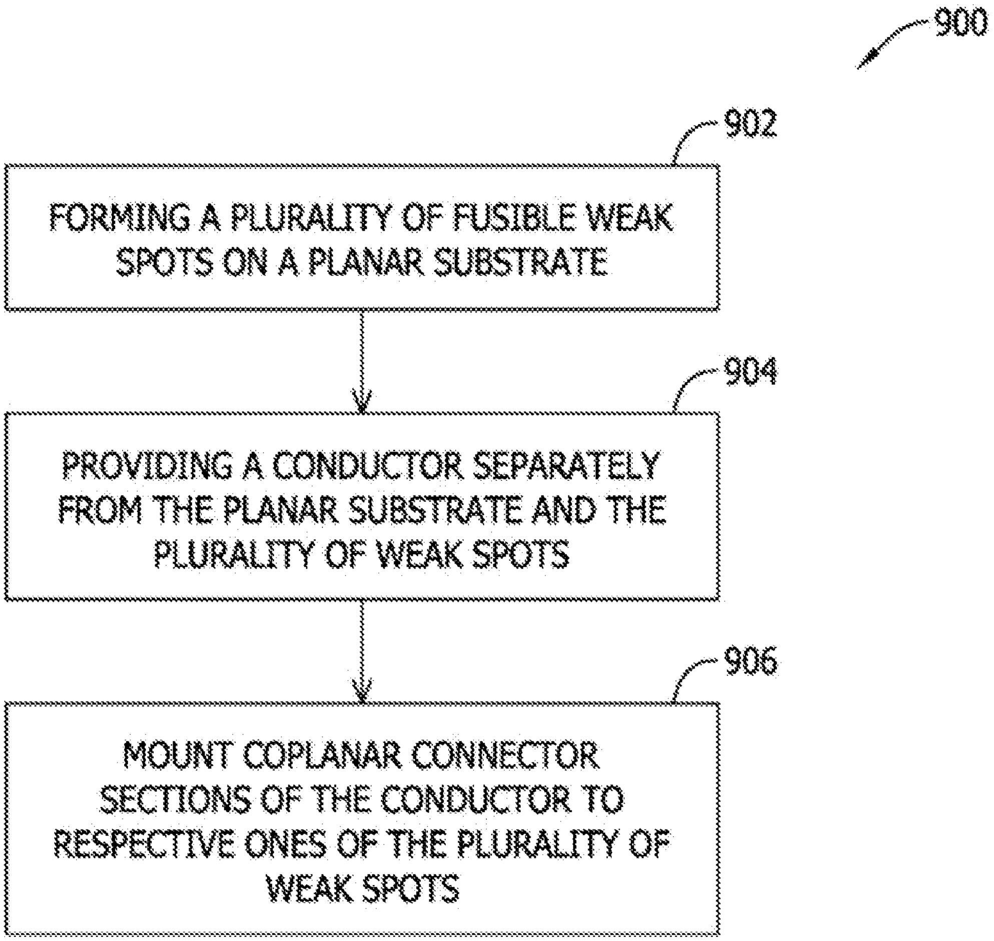
FIG. 9 is a schematic flow chart illustrating the method illustrated in FIG. 8.

FIGS. 8 and 9 show an exemplary method 900 of fabricating a power fuse for protecting an electrical load subject to transient load current cycling events in a direct current electrical power system. FIG. 8 shows a schematic diagram of the method 900, while FIG. 9 shows a flow chart of the method 900. The method 900 includes forming 902 a plurality of fusible weak spots on a planar substrate such that the plurality of fusible weak spots may be longitudinally spaced from one another on the planar substrate. The method 900 further includes providing 904 a conductor separately from the planar substrate and the plurality of weak spots. The number of coplanar connector sections of the conductor may be the same as the number of weak spots formed on the planar substrate. The method 900 also includes 906 mounting the coplanar connector sections of the conductor to respective ones of the plurality of weak spots. As a result, the obliquely extending sections of the conductor extend above the elongated planar substrate in between the plurality of fusible weak spots, and the first and second terminal tabs of the conductor extend coplanar to one another in a plane parallel to but spaced from the coplanar connector sections and the substrate. In one example, the coplanar connection sections of the conductor may be brazed to the weak spots. In some embodiments, the conductor is formed in one piece. The conductor 800 may include support bridges 802 connecting the coplanar connector sections 318 (FIG. 8). The method 900 may further include removing the support bridges after the coplanar connector sections of the conductor have been mounted on respective ones of the plurality of weak spots.

Figure 10A:
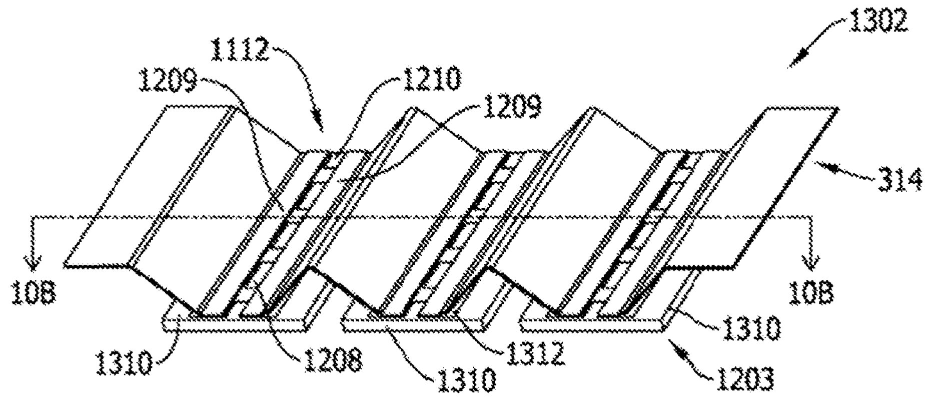
FIG. 10A is a schematic perspective view of another exemplary fuse element assembly for the power fuse illustrated in FIG. 3.
Figure 10B:
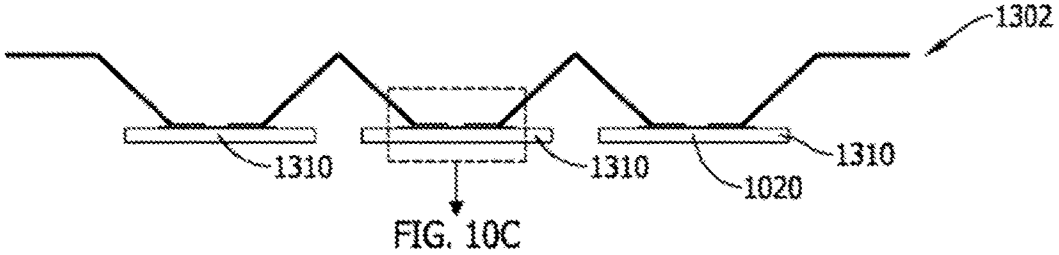
FIG. 10B is a schematic cross-sectional view of the fuse element assembly illustrated in FIG. 10A along line 10B-10B.
Figure 10C:
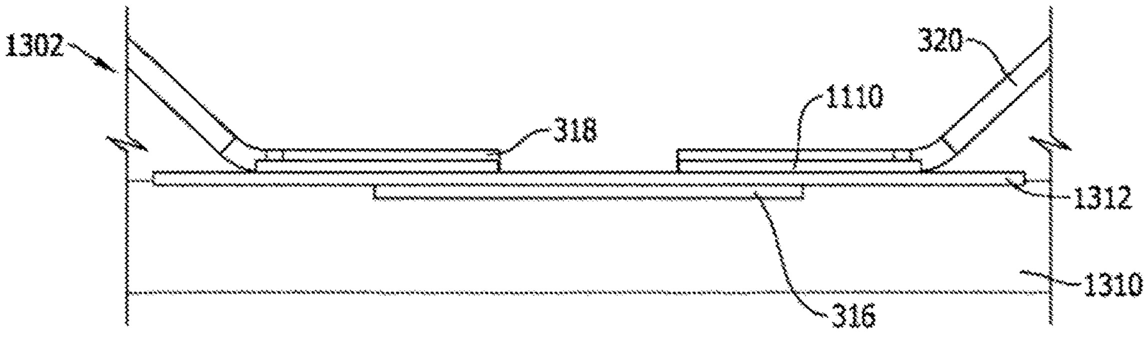
FIG. 10C is a schematic enlarged cross-sectional view of a portion of the fuse element assembly illustrated in FIG. 10A.

FIGS. 10A-10C show another exemplary fuse element assembly 1302 included in the power fuse 300. FIG. 10A is a perspective view of the fuse element assembly 1302. FIG. 10B is a cross-sectional view of the fuse element assembly 1302 along line 10B-10B illustrated in FIG. 10A. FIG. 10C is an enlarged view of a section of the fuse element assembly 1302 as marked in FIG. 10B. Different from the fuse element assembly 302, where the substrate 310 is in one piece (see FIG. 4), substrates 1310 of the fuse element assembly 1302 may be separate from one another. The weak spot 1312 and its substrate 1310 may be collectively referred to as a weak spot pad 1203. The substrate 310 typically is not electrically conductive, but may become electrically conductive in the DC arc plasma. Therefore, the arc may not be extinguished within a desired period of time, causing damages to the fuse element assembly 302 and the power fuse 300.

In contrast, the substrates 1310 of the fuse element assembly 1302 may be separate from one another. The arc extinguishing filler 330 may be filled in the fuse 300, including the space separating adjacent substrates 1310. As a result, the arc is suppressed by the arc extinguishing filler 330.

Figure 12:
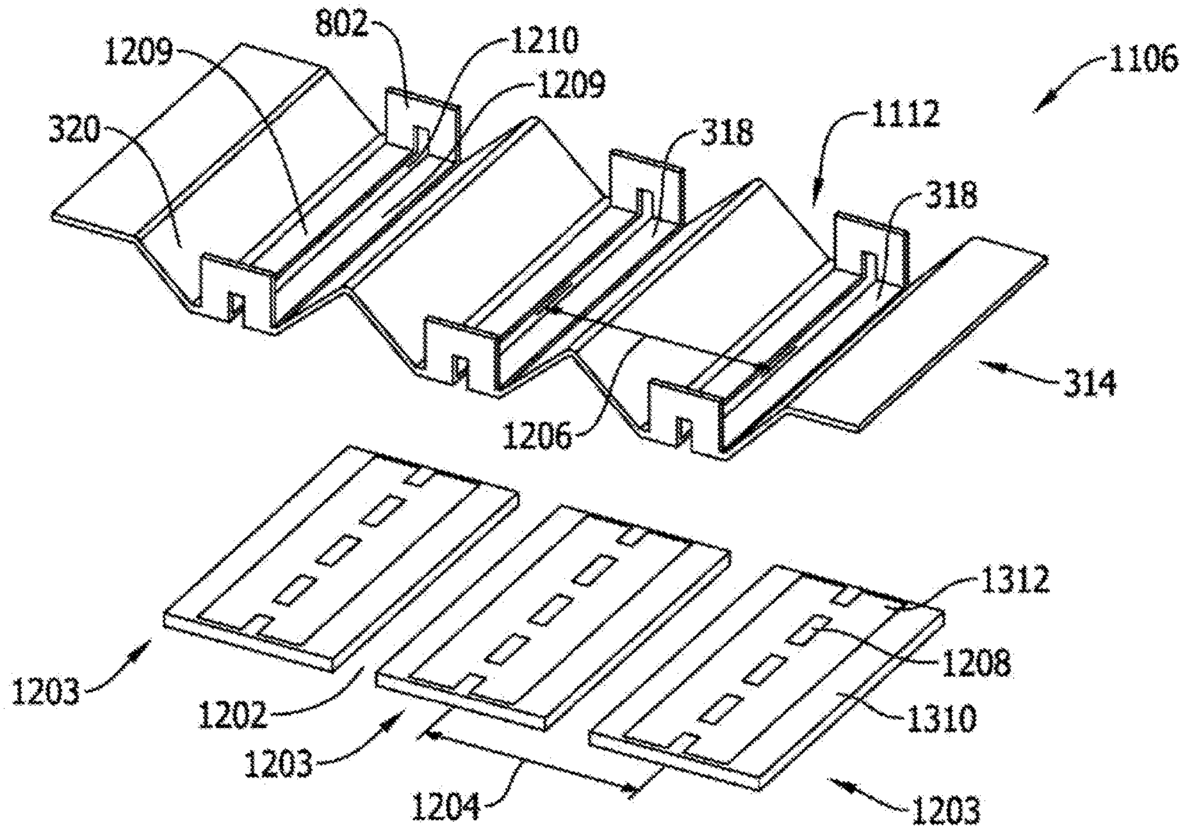
FIG. 12 is a schematic diagram of attaching the conductor with the weak spots in the method illustrated in FIG. 11.

In the exemplary embodiment, weak spots 1312 may be included in the fuse element assembly 1302. Compared to the weak spot 312 (see FIG. 5), which is one block, the weak spot 1312 has one or more openings 1208 (FIG. 10A, also see FIG. 12). The openings 1208 increase the number of weak spots 1312 in one weak spot pad 1203. Instead of one single weak spot 312, the weak spot 1312 includes additional weak spots defined by the openings 1208, besides the weak spot 1312 itself. The openings 1208 may be illustrated as rectangular in the depicted embodiment for the illustration purpose only. The openings 1208 may be in other shapes such as circular, oval, square, or irregular shapes that enable the openings 1208 to function as described herein. In some embodiments, the fuse element assembly 1302 includes the weak spots 312, instead of the weak spots 1312. In other embodiments, the fuse element assembly 1302 includes a mix of the weak spots 312 and the weak spots 1312.

In some embodiments, the substrate 1310 may be a rod having an increased thickness than a substrate formed as a sheet. The rod may be a square rod or rectangular rod where the axial profile 1020 is square or rectangular (FIG. 10B). The axial profile 1020 may be in other shapes that enable the substrate 1310 to function as described herein. Compared to a sheet substrate, a rod substrate 1310 has an increased mass, which increases the thermal conductivity of the substrate 1310 for transmitting heat away from the conductor 314 and the weak spots 312, 1312.

Figure 11:
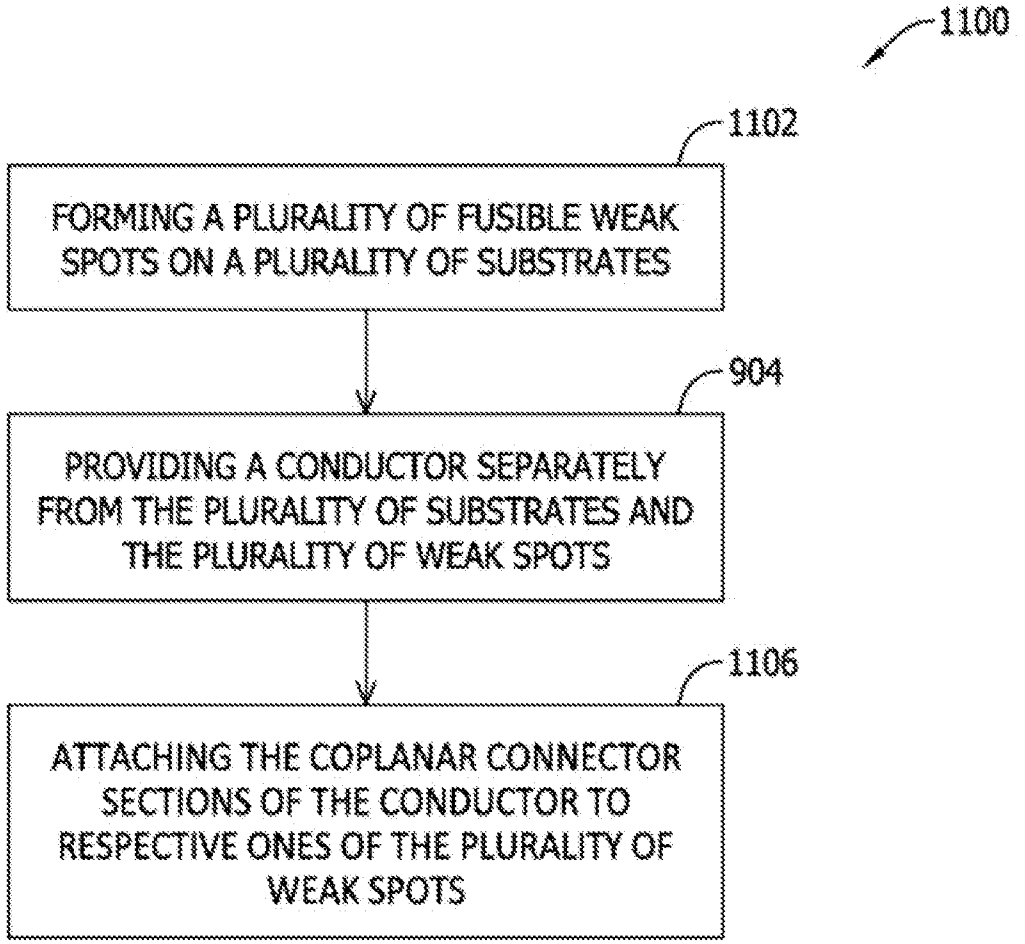
FIG. 11 is a schematic flow chart of another exemplary method of fabricating a power fuse.

FIG. 11 is a flow chart of another exemplary method 1100 of fabricating a power fuse for protecting an electrical load subject to transient load current events in a direct current electrical power system. The method 1100 includes forming 1102 a plurality of fusible weak spots on a plurality of substrates. The plurality of fusible weak spots 1312 may be first formed on the substrate 1310 that is initially one single piece and the plurality of fusible weak spots 1312 may be then separated from one another by cutting the substrate 1310 into a plurality of substrates with each substrate 1310 having one weak spot 1312. Alternatively, the substrates 1310 may be provided as individual pieces and one weak spot 1312 is formed onto one substrate 1310. The weak spots 1312 may be formed on the substrates 1310 by printing the weak spots onto the substrates 1310. The method 1100 further includes providing 904 a conductor separately from the plurality of substrates and the plurality of weak spots. The method 1100 also includes attaching 1106 the coplanar connector sections of the conductor to respective ones of the plurality of weak spots such that the plurality of weak spots may be longitudinally spaced apart from one another along the conductor and the plurality of planar substrates may be longitudinally spaced apart from one another along the conductor. In other words, the weak spots 1312 may be spaced apart from one another along a longitudinal direction of the conductor 314, and the substrates 1310 may be spaced apart from one another along the longitudinal direction of the conductor 314.

In some embodiments, in attaching 1106 the weak spot 1312 to the conductor 314, solder 1110 is applied to the weak spot pads 1203 with the substrate 1310 initially as one piece. In one example, the solder 1110 is applied to the substrate 1310 by stencil printing the solder 1110 onto the substrate 1310 and reflowing the solder 1110 on the substrate 1310. Afterwards, the weak spots 1312 may be separated from one another such that each substrate 1310 includes one weak spot 1312. Weak spot pads 1203 may be placed in a tape and reel or matrix tray. A solder paste or flux (not illustrated) is applied to coplanar connector sections 318 of the conductor 314. In one example, the solder paste or flux is placed on a side of the coplanar connector section 318 opposite a valley 1112 formed by the coplanar connector section 318 and its neighboring obliquely extending sections 320. The conductor 314 is placed over the weak spot pads 1203. Alternatively, the weak spot pads 1203 may be placed over the conductor 314. In another example, the solder paste or flux is placed on a side of the coplanar connector section 318 the same as the valley 1112. The weak spot pads 1203 may be picked up and placed in the valley 1112 of the conductor 314. Once the weak spot pads 1203 and the conductor 314 are placed together, the conductor 314 and the weak spot pads 1203 may be reflowed. In one example, weight may be applied to the tops of the substrates 1310 or the coplanar connector section 318 to facilitate reflow.

FIG. 12 is a schematic diagram of an exemplary embodiment of attaching 1106 the coplanar connector sections of the conductor, where the weak spots 1312 may be mounted to the side of the conductor 314 opposite the valley 1112. The weak spot pads 1203 may be lined up with a spacing 1202 between neighboring weak spot pads 1203 such that a distance 1204 between neighboring weak spot pads 1203 is approximately the same as a distance 1206 between neighboring coplanar connector sections 318.

In the exemplary embodiment, the coplanar connector section 318 includes two portions 1209 separate by a gap 1210 (also see FIG. 10A). The two portions 1209 may be connected by the support bridge 802. The support bridge 802 extends from the two portions 1209 in the same direction as the extension direction of the obliquely extending section 320. In mounting conductor 314 to the weak spot pads 1203, the support bridge and the gap 1210 may be used to align the coplanar connector section 318 with the weak spot 1312 such that the gap 1210 is aligned with the openings 1208 (see FIG. 10A). The support bridges 802 may be removed after the coplanar connector sections 318 of the conductor 314 are attached to the plurality of weak spots 1312.

Figure 13A:
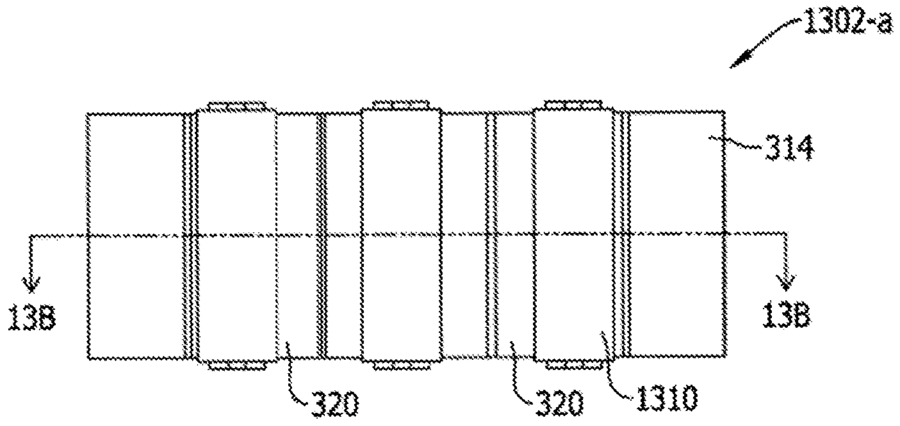
FIG. 13A is a schematic top view of one more exemplary fuse element assembly for the power fuse illustrated in FIG. 3.
Figure 13B:
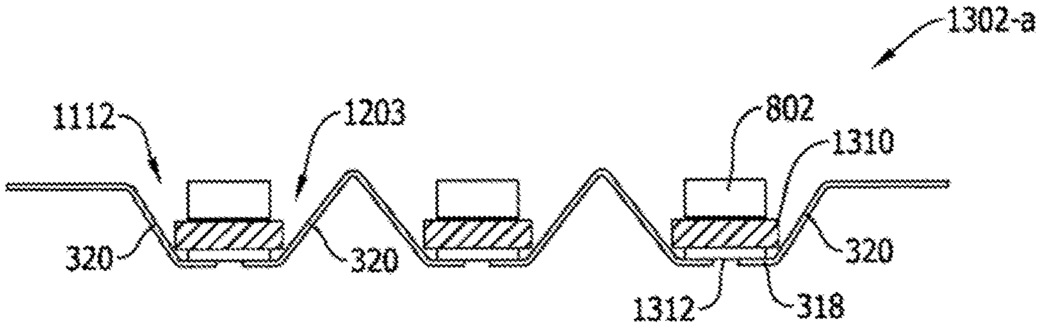
FIG. 13B is a schematic cross-sectional view of the fuse element assembly illustrated in FIG. 13A along line 13B-13B.
Figure 13C:
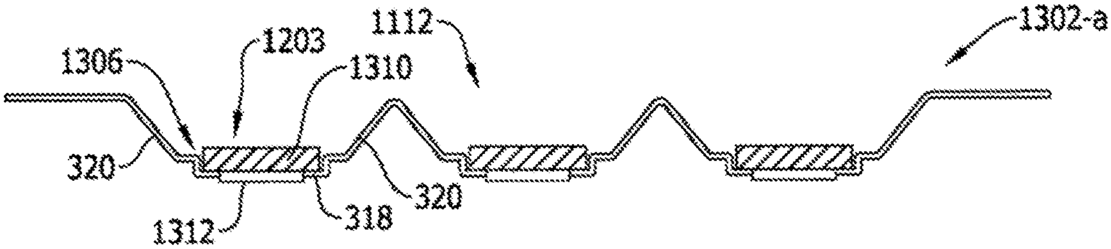
FIG. 13C is a schematic cross-sectional view of the fuse element assembly illustrated in FIG. 13A along line 13B-13B, where the fuse element has an alternative configuration from that of the fuse element illustrated in FIG. 13B.

FIGS. 13A-13C show another embodiment of attaching 1106 the coplanar connector sections to the respective ones of the plurality of weak spots, where the plurality of weak spots 1312 may be mounted on the side of the coplanar connector sections 318 the same as the valley 1112. FIG. 13A is a top view of a fuse element assembly 1302-*a*. FIGS. 13B and 13C are cross sectional views of the fuse element assembly 1302-*a* along line 13B-13B as marked in FIG. 13A. FIG. 13C shows an alternative configuration of the fuse element assembly 1302-*a*. Different from the fuse element assembly 1302 (FIGS. 10A-10C), where the weak spot pads 1203 may be disposed on a side of the coplanar connector sections 318 opposite the valleys 1112, the weak spot pads 1203 in the fuse element assembly 1302-*a* may be disposed in the valley 1112. By disposing the weak spot pads 1203 in the valley 1112, the arc is formed at the side opposite the weak spot 1312 or the valley 1112, which is surrounded by arc extinguishing filler 330, thereby increasing the effectiveness of arc quenching. The dimensions of the conductor 314 and/or the weak spot pads 1203 may be modified for the conductor 314 to receive the weak spot pads 1203 in the valleys 1112 of the conductor 314. In some embodiments, the obliquely extending sections 320 and the support bridge 802 form a receptacle sized to receive the substrate 1310 therein. The oblique extending sections 320 and the support bridge 802 may be used to align and hold the substrates in position during reflow. The support bridges 802 may be removed after the coplanar connector sections 318 of the conductor 314 are attached to the plurality of weak spots 1312.

FIG. 13C shows the alternative configuration of the fuse element assembly 1302-*a*. Compared to the fuse element assembly 1302-*a* illustrated in FIG. 13B, the fuse element assembly 1302-*a* illustrated in FIG. 13C forms a pocket 1306 sized to receive the weak spot 1312 and weak spot pads 1203. As a result, the weak spots 1312 and the weak spot pads 1203 may be self-aligned in the coplanar connector sections 318. In some embodiments, the support bridge 802 may be used for the alignment. Because of the self-alignment and/or increased ease in alignment, the connections between the weak spots 1312 and the coplanar connector sections 318 through soldering may be simplified or even eliminated.

Figure 14:
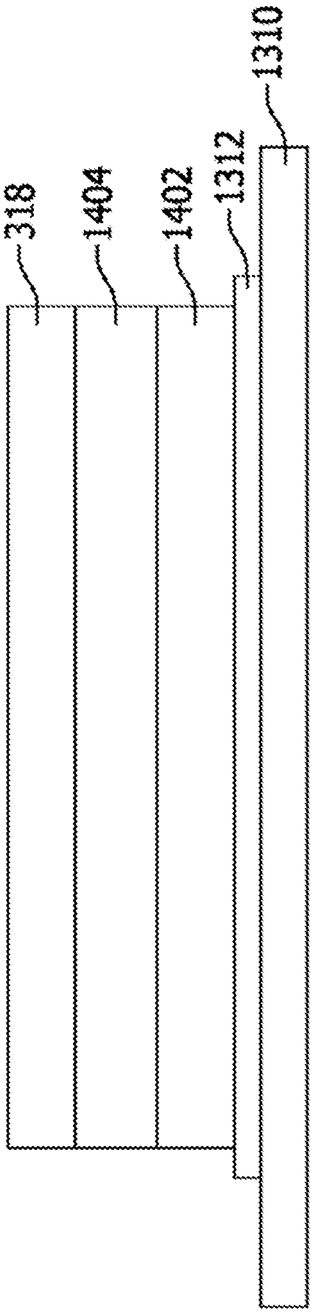
FIG. 14 is a schematic diagram of an exemplary coupling mechanism between the weak spot and the conductor of the power fuse illustrated in FIG. 3.

FIG. 14 is a schematic diagram of an exemplary coupling mechanism between the substrate 1310 and the coplanar connector section 318. The coupling mechanism may be applied to the fuse element assembly 302, 1302, 1302-*a*. In the exemplary embodiment, the weak spot 1312 is deposited on the substrate 1310. A first solder 1402 and a second solder 1404 may be used to couple the substrate 1310 with the coplanar connector section 318. The melting temperature of the first solder 1402 is higher than the melting temperature of the second solder 1404. As a result, the first solder 1402 forms a diffusion barrier for the weak spot 312 to diffuse into the first and second solders 1402, 1404, and slows down melting of the first and second solders 1402, 1404, thereby reducing solder joint fatigue, which causes failure in electrical connections and renders fuses inoperable.

Weak spots 312 may be used in place of weak spots 1312 and vice versa to enable the fuse element assemblies and methods to function or operate as described herein.

The benefits and advantages of the present disclosure are now believed to have been amply illustrated in relation to the exemplary embodiments disclosed.

Various embodiments of power fuses and fuse element assemblies and their fabrication methods are described herein including a plurality of weak spots formed on a substrate without stamped weak spot openings, thereby avoiding thermal-mechanical fatigue strain in the fuse element assembly when subjected to transient load current cycling events. Further, the fuse assembly includes a conductor having coplanar connector sections mounted on the weak spots and obliquely extending sections extending above the substrate such that an arc extinguishing filler can be disposed to surround at least part of the fuse element assembly, thereby effectively extinguishing arc generated after the fuse element assembly opens at predetermined current conditions.

While exemplary embodiments of components, assemblies and systems are described, variations of the components, assemblies and systems are possible to achieve similar advantages and effects. Specifically, the shape and the geometry of the components and assemblies, and the relative locations of the components in the assembly, may be varied from those described and depicted without departing from inventive concepts described. Also, in certain embodiments, certain components in the assemblies described may be omitted to accommodate particular types of fuses or the needs of particular installations, while still providing the needed performance and functionality of the fuses.

An embodiment of a power fuse for protecting an electrical load subject to transient load current cycling events in a direct current electrical power system has been disclosed. The power fuse includes at least one fuse element assembly that includes an elongated planar substrate, a plurality of fusible weak spots, and a conductor. The plurality of fusible weak spots are formed on the planar substrate and are longitudinally spaced from one another on the planar substrate. The conductor is separately provided from the planar substrate and the plurality of weak spots. The conductor includes a solid elongated strip of metal having no stamped weak spot openings therein and therefore avoiding thermal-mechanical fatigue strain in the conductor when subjected to the transient load current cycling events. The solid elongated strip of metal includes coplanar connector sections that are mounted to respective ones of the plurality of weak spots on the planar substrate and obliquely extending sections bent out of plane of the connector sections to extend above the elongated planar substrate in between the plurality of fusible weak spots. The conductor further includes first and second terminal tabs that extend coplanar to one another in a plane parallel to but spaced from the connector sections and the substrate.

Optionally, the power fuse further includes an arc quenching media that surrounds at least part of the at least one fuse element assembly. The at least one fuse element assembly further includes a dielectric layer formed over the substrate and nested between the substrate and the plurality of weak spots. The conductor is formed in one piece. The substrate is alumina ceramic. The power fuse further includes a housing enclosing the at least one fuse element assembly.

The plurality of fusible weak spots are printed on the planar substrate. The power fuse of has a voltage rating of at least 500 V. The power fuse has a current rating of at least 150 A. The at least one fuse element assembly includes first and second fuse element assemblies electrically connected in parallel with each other.

A method of fabricating a power fuse for protecting an electrical load subject to transient load current cycling events in a direct current electrical power system has been disclosed. The method includes forming a plurality of fusible weak spots on an elongated planar substrate such that the plurality of fusible weak spots are longitudinally spaced from one another on the planar substrate. The method further includes providing a conductor separately from the planar substrate and the plurality of weak spots. The conductor includes a solid elongated strip of metal having no stamped weak spot openings therein and therefore avoiding thermal-mechanical fatigue strain in the conductor when subjected to the transient load current cycling events. The solid elongated strip of metal includes coplanar connector sections and obliquely extending sections bent out of plane of the connector sections. The conductor further includes first and second terminal tabs that extend coplanar to one another. The method also includes mounting the coplanar connector sections of the conductor to respective ones of the plurality of weak spots on the planar substrate such that the obliquely extending sections of the conductor extend above the elongated planar substrate in between the plurality of fusible weak spots and the first and second terminal tabs extend coplanar to one another in a plane parallel to but spaced from the connector sections and the substrate, thereby completing a first fuse element assembly.

Optionally, the method further includes surrounding at least part of the first fuse element assembly with an arc quenching medium. Forming a plurality of weak spots includes printing the plurality of weak spots on the elongated planar substrate. Forming a plurality of weak spots further includes providing a dielectric layer on the substrate, and forming the plurality of weak spots over the dielectric layer to cover the dielectric layer and to nest the dielectric layer between the substrate and the plurality of weak spots. Forming a dielectric layer includes printing the dielectric layer on the substrate, and forming the plurality of weak spots includes printing the plurality of weak spots over the dielectric layer to cover the dielectric layer and to nest the dielectric layer between the substrate and the plurality of weak spots. Providing a conductor further includes forming the conductor in one piece. The conductor is formed with support bridges connecting the coplanar connector sections, and mounting the coplanar connector sections further includes removing the support bridges after the coplanar connector sections of the conductor have been mounted on respective ones of the plurality of weak spots. The substrate includes alumina ceramic. The method further includes forming a second fuse element assembly, and electrically connecting the first and second fuse element assemblies in parallel with each other. The method further includes electrically connecting the first and second terminal tabs of the conductor with first and second conductive terminals, and enclosing the first fuse element assembly with a housing, leaving at least part of the first and second conductive terminals exposed.

Another embodiment of a power fuse for protecting an electrical load subject to transient load current cycling events in a direct current electrical power system is disclosed. The power fuse includes at least one fuse element assembly including a plurality of planar substrates, a plurality of fusible weak spots, each formed on one of the plurality of planar substrates, and a conductor. The conductor is separately provided from the plurality of planar substrates and the plurality of weak spots, wherein the conductor includes an elongated strip of metal having no stamped weak spot openings therein and therefore avoiding thermal-mechanical fatigue strain in the conductor when subjected to the transient load current cycling events. The elongated strip of metal further includes coplanar connector sections that are attached to respective ones of the plurality of weak spots and obliquely extending sections bent out of plane of the coplanar connector sections. The plurality of weak spots are longitudinally spaced apart from one another along the conductor, and the plurality of planar substrates are longitudinally spaced apart from one another along the conductor.

Optionally, one of the plurality of fusible weak spots includes openings. The plurality of fusible weak spots are printed on the planar substrates. Each of the plurality of weak spots is attached to a side of one of the coplanar connector sections the same as a valley formed by the coplanar connector section and its neighboring obliquely extending sections. The coplanar connector section forms a pocket sized to receive the weak spot therein. The coplanar connector sections are attached to respective ones of the plurality of weak spots through a first solder and a second solder, the first solder having a melting temperature higher than the melting temperature of the second solder, the first solder deposited over the respective ones of the plurality of weak spots, and the second solder deposited over the first solder.

Another embodiment of a method of fabricating a power fuse for protecting an electrical load subject to transient load current cycling events in a direct current electrical power system is disclosed. The method includes forming a plurality of fusible weak spots on a plurality of planar substrates. The method also includes providing a conductor separately from the plurality of planar substrates and the plurality of weak spots, wherein the conductor includes an elongated strip of metal having no stamped weak spot openings therein and therefore avoiding thermal-mechanical fatigue strain in the conductor when subjected to the transient load current cycling events. The elongated strip of metal includes coplanar connector sections and obliquely extending sections bent out of plane of the coplanar connector sections. The method further includes attaching the coplanar connector sections of the conductor to respective ones of the plurality of weak spots such that the plurality of weak spots are longitudinally spaced apart from one another along the conductor and the plurality of planar substrates are longitudinally spaced apart from one another along the conductor.

Optionally, attaching the coplanar connector sections further includes attaching one of the plurality of weak spots to its respective one of the coplanar connector sections at a side of the coplanar connector section opposite a valley formed by the coplanar connector section and its neighboring obliquely extending sections. Alternatively, attaching the coplanar connector sections further includes attaching one of the plurality of weak spots to its respective one of the coplanar connector sections at a side of the coplanar connector section the same as a valley formed by the coplanar connector section and its neighboring obliquely extending sections. The conductor further includes a support bridge connecting the coplanar connector sections, the obliquely extending sections and the support bridge forming a receptacle sized to receive one of the plurality of planar substrates therein. Attaching the coplanar connector sections further includes aligning the coplanar connector sections with the plurality of planar substrates using the support bridges and the obliquely extending sections and holding the planar substrates in place using the support bridges and the obliquely extending sections during reflow. Attaching the coplanar connector sections also includes removing the support bridges after the coplanar connector sections of the conductor have been attached with respective ones of the plurality of weak spots. Forming a plurality of fusible weak spots further includes forming the plurality of fusible weak spots on a single piece of planar substrate and separating the single piece of planar substrate into the plurality of planar substrates such that each planar substrate includes one weak spot. Forming the plurality of fusible weak spots on a single piece of planar substrate further includes applying a first solder to the plurality of weak spots. Applying a first solder further includes stencil printing the first solder to the plurality of weak spots and reflowing the first solder on the plurality of weak spots. Attaching the coplanar connector sections further includes dispensing a second solder on the coplanar connector sections of the conductor, wherein the second solder has a melting temperature lower than the melting temperature of the first solder, placing the plurality of weak spots with the coplanar connector sections such that the first solder and the second solder face each other, and reflowing the first solder and the second solder. Attaching the coplanar connector sections further includes placing the plurality of weak spots with the coplanar connector sections and applying weight to at least one of the plurality of planar substrates and the coplanar connector sections. One of the plurality of fusible weak spots includes openings. Forming a plurality of fusible weak spots further includes forming the plurality of fusible weak spots on the plurality of planar substrates by printing the plurality of fusible weak spots on the plurality of planar substrates. One of the coplanar connector sections forms a pocket sized to receive one of the plurality of weak spots, attaching the coplanar connector sections further including disposing the weak spot into the pocket.

One more embodiment of a power fuse for protecting an electrical load subject to transient load current cycling events in a direct current electrical power system is disclosed. The power fuse includes at least one fuse element assembly including one or more substrates, one or more fusible weak spots each printed on one of the one or more substrates, and a conductor. The conductor is separately provided from the one or more substrates and the one or more weak spots, wherein the conductor includes an elongated strip of metal having no stamped weak spot openings therein and therefore avoiding thermal-mechanical fatigue strain in the conductor when subjected to the transient load current cycling events. The elongated strip of metal further includes coplanar connector sections that are attached to respective ones of the one or more weak spots and obliquely extending sections bent out of plane of the coplanar connector sections. The one or more weak spots are longitudinally spaced apart from one another along the conductor, and the one or more substrates are longitudinally spaced apart from one another along the conductor.

Optionally, one of the one or more substrates forms into a rod having an increased thickness than a substrate formed as a sheet.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power fuse for protecting an electrical load subject to transient load current cycling events in a direct current electrical power system, the power fuse comprising:

at least one fuse element assembly comprising:

one or more substrates;

one or more sets of weak spots respectively formed on top of the one or more substrates, each set of weak spots comprising one or more fusible weak spots; and a conductor separately provided from the one or more substrates and the one or more sets of weak spots, wherein the conductor comprises one or more strips of metal having no stamped weak spot openings therein and therefore avoiding thermal-mechanical fatigue strain in the conductor when subjected to transient load current cycling events, the conductor further comprising:

connector sections that are attached to respective ones of the one or more sets of weak spots; and extending sections coupling the connector sections, wherein the one or more substrates are longitudinally spaced apart from one another along the conductor.

2. The power fuse of claim 1, wherein one of the one or more fusible weak spots includes openings.

3. The power fuse of claim 1, wherein one or more of the sets of weak spots are printed on respective ones of the one or more substrates.

4. The power fuse of claim 1, wherein each of the one or more sets of weak spots is attached to a side of one of the connector sections, wherein the one of the connector sections forms one or more pockets sized to receive the set of weak spots therein.

5. The power fuse of claim 1, wherein the connector sections are attached to respective ones of the sets of weak spots through a first solder and a second solder, the first solder having a melting temperature higher than a melting temperature of the second solder, the first solder deposited over the respective ones of the sets of weak spots, and the second solder deposited over the first solder.

6. The power fuse of claim 1, wherein one of the one or more substrates forms into a rod having an increased thickness than a substrate formed as a sheet.

7. A method of fabricating a power fuse for protecting an electrical load subject to transient load current cycling events in a direct current electrical power system, the method comprising:

forming one or more sets of weak spots respectively on top of one or more substrates, each set of weak spots comprising one or more fusible weak spots;

providing a conductor separately from the one or more substrates and the one or more sets of weak spots, wherein the conductor includes one or more strips of metal having no stamped weak spot openings therein and therefore avoiding thermal-mechanical fatigue strain in the conductor when subjected to transient load current cycling events, the conductor further including:

connector sections, and extending sections coupling the connector sections; and attaching the connector sections of the conductor to respective ones of the one or more sets of weak spots, wherein the one or more substrates are longitudinally spaced apart from one another along the conductor.

8. The method of claim 7, wherein attaching the connector sections further comprises attaching one of the sets of weak spots to a side of one of the connector sections, wherein the one of the connector sections forms one or more pockets sized to receive the one of the sets of weak spots therein.

9. The method of claim 7, wherein the conductor further includes one or more support bridges, each support bridge connecting pairs of connector sections, attaching the connector sections further comprising:

aligning the connector sections with the one or more substrates using the one or more support bridges and the extending sections;

holding the substrates in place using the support bridges and the extending sections during reflow; and removing the support bridges after the connector sections of the conductor have been attached with respective ones of the sets of weak spots.

10. The method of claim 7, wherein forming each of the one or more sets of weak spots further comprises:

forming the one or more fusible weak spots on a single piece of respective ones of the one or more substrates; and separating the single piece of substrate into the one or more substrates such that each substrate includes one weak spot.

11. The method of claim 10, wherein forming the fusible weak spots on a single piece of substrate further comprises applying a first solder to the set of weak spots.

12. The method of claim 11, wherein applying a first solder further comprises:

stencil printing the first solder to the set of weak spots; and reflowing the first solder on the set of weak spots.

13. The method of claim 11, wherein attaching the connector sections further comprises:

dispensing a second solder on the connector sections of the conductor, wherein the second solder has a melting temperature lower than a melting temperature of the first solder;

placing the set of weak spots with the connector sections such that the first solder and the second solder face each other; and reflowing the first solder and the second solder.

14. The method of claim 7, wherein attaching the connector sections further comprises:

placing the set of weak spots with the connector sections; and applying weight to at least one of the one or more substrates and the connector sections.

15. The method of claim 7, wherein one of the one or more fusible weak spots includes openings.

16. The method of claim 7, wherein forming a set of weak spots further comprises forming the one or more fusible weak spots on the one or more substrates by printing the one or more fusible weak spots on the one or more substrates.

17. The method of claim 7, wherein one of the connector sections forms a pocket sized to receive one of the sets of weak spots, attaching the connector sections further comprising disposing the one of the sets of weak spots into the pocket.

* * * * *